H. W. Sargeant, Jr.,
Flour Sieve.
N° 49,441.  Fig. 1 Patented Aug. 15, 1865.
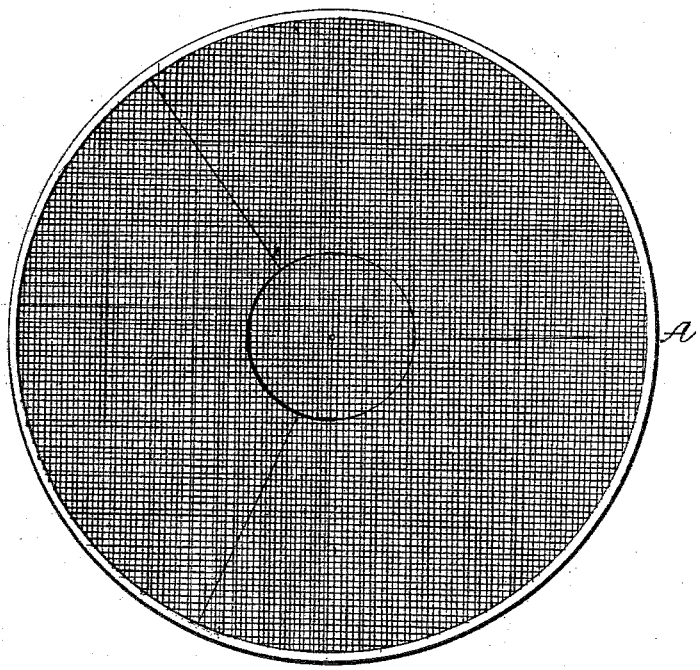
Fig. 2
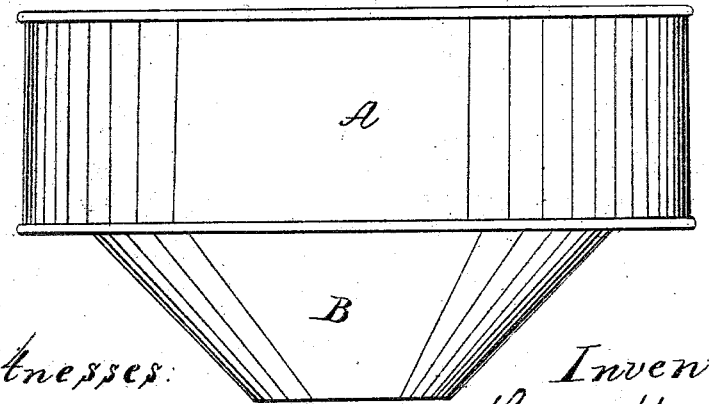
Witnesses:  Inventor:
O. H. Phillips  Henry W. Sargeant, Jr.
F. Smith

UNITED STATES PATENT OFFICE.

HENRY W. SARGEANT, JR., OF LOWELL, MASSACHUSETTS.

FLOUR-SIFTER.

Specification forming part of Letters Patent No. 49,441, dated August 15, 1865.

*To all whom it may concern:*

Be it known that I, HENRY W. SARGEANT, Jr., of Lowell, in the county of Middlesex and State of Massachusetts, have invented a new and useful Improvement on a Sieve; and I do hereby declare that the following is a full, clear, and exact description of the construction and operation of the same, reference being had to the annexed drawings making a part of this specification, in which—

Figure 1 is a top view; Fig. 2, a side elevation.

Letter A in each drawing represents the sieve.

Letter B represents the tunnel attached to the sieve.

To enable others skilled in the art to make and use my invention, I will proceed to describe its construction and operation.

I construct a sieve in any desired form and apply thereto a tunnel to fit the same, securing it in its place under the wire-cloth with tacks, screws, or otherwise.

The object of providing the under part of a sieve with a tunnel is for the purpose of making the sifted substance fall more compactly, thus preventing dust and wasting the flour, meal, &c., while sifting.

Having thus fully described the nature of my invention, what I claim as new, and desire to secure by Letters Patent, is—

Providing a sieve with a tunnel, substantially as and for the purpose herein described.

HENRY W. SARGEANT, JR.

Witnesses:
J. H. PHILLIPS,
F. SMITH.